United States Patent
Leise et al.

(10) Patent No.: US 8,988,277 B2
(45) Date of Patent: Mar. 24, 2015

(54) DUAL MONOPULSE/INTERFEROMETER RADAR AESA APERTURE

(75) Inventors: Thomas T. Leise, Collinsville, TX (US); Domingo Cruz-Pagan, Allen, TX (US)

(73) Assignee: Raytheon Company, Waltham, MA (US)

( * ) Notice: Subject to any disclaimer, the term of this patent is extended or adjusted under 35 U.S.C. 154(b) by 629 days.

(21) Appl. No.: 13/291,193

(22) Filed: Nov. 8, 2011

(65) Prior Publication Data

US 2013/0113651 A1    May 9, 2013

(51) Int. Cl.
*G01S 13/44* (2006.01)
*H01Q 3/26* (2006.01)
*H01Q 21/00* (2006.01)
*H01Q 21/06* (2006.01)

(52) U.S. Cl.
CPC ............. *H01Q 3/26* (2013.01); *G01S 13/4454* (2013.01); *G01S 13/4463* (2013.01); *H01Q 21/0025* (2013.01); *H01Q 21/061* (2013.01)
USPC ............................... 342/80; 342/146; 342/156

(58) Field of Classification Search
CPC ...................................... G01S 3/46; G01S 3/48
USPC ........................ 342/73, 80, 146, 149, 156, 157
See application file for complete search history.

(56) References Cited

U.S. PATENT DOCUMENTS

| | | | | |
|---|---|---|---|---|
| 3,965,475 A | * | 6/1976 | Deerkoski et al. | 342/374 |
| 4,348,679 A | * | 9/1982 | Shnitkin et al. | 343/768 |
| 4,766,437 A | * | 8/1988 | Schmidt et al. | 342/368 |
| 4,768,034 A | * | 8/1988 | Preikschat et al. | 342/80 |
| 6,313,794 B1 | * | 11/2001 | Rose | 342/424 |
| 6,618,008 B1 | * | 9/2003 | Scholz | 342/427 |
| 2005/0012655 A1 | * | 1/2005 | Lalezari et al. | 342/62 |
| 2005/0156780 A1 | * | 7/2005 | Bonthron et al. | 342/107 |
| 2010/0033376 A1 | * | 2/2010 | Pozgay | 342/372 |
| 2011/0215963 A1 | * | 9/2011 | Perl | 342/156 |

* cited by examiner

*Primary Examiner* — John B Sotomayor
*Assistant Examiner* — Marcus Windrich
(74) *Attorney, Agent, or Firm* — Lando & Anastasi, LLP

(57) ABSTRACT

A dual monopulse/interferometer antenna and radar system. In one example, the antenna includes an active electronically steered monopulse array, and is configurable into an interferometer mode which uses a subset of the array elements of each quadrant of the monopulse array. In one example, the RF feed network that combines signals received from each element in the array to produce monopulse return signals is modified in the interferometer mode to couple out the subset of array elements to produce return signals that are analyzed using interferometric processing.

16 Claims, 4 Drawing Sheets

DUAL MONOPULSE/INTERFEROMETER RADAR AESA APERTURE

BACKGROUND

A monopulse antenna can be used to gather angle information about a target, for example, when used in a tracking radar. The monopulse antenna system uses four antennas, or four quadrants of a single antenna that are controlled together. The target is illuminated by all four quadrants, and a comparator network is used to produce four return signals. These return signals include a "sum" signal that is a combination of the received signal from all four quadrants, an elevation difference signal that is formed by subtracting the signal from the two upper quadrants from the signal from the two lower quadrants, an azimuth difference signal formed by subtracting the signals from the left quadrants from the signals from right quadrants, and a diagonal difference signal that is generally unused. In a tracking radar, the sum signal is used to track the target's distance from the monopulse radar system and the azimuth difference signal is used to determine the target's position to the left or right of the radar system. The elevation difference signal may be used to determine the target's position relative to the horizon.

SUMMARY OF INVENTION

The accuracy with which a radar system can determine the angular position of the target relative to the radar system, or the angular error of the antenna, may be an important measure of system performance. Aspects and embodiments are directed to a dual monopulse/interferometer radar antenna that may have significantly reduced angular error compared to an equivalent monopulse antenna. As discussed further below, in one example, a single active electronically steered array (AESA) aperture is configured to provide simultaneous or time-multiplexed monopulse and interferometer modes of operation to achieve approximately two times better angular accuracy than that obtained using the AESA in a monopulse mode alone.

According to one embodiment, a dual monopulse/interferometer antenna system comprises an active electronically steered array including four quadrants, each quadrant including a plurality of antenna elements configured to receive radio frequency (RF) signals and to provide received signals, and a feed network coupled to the array. The feed network includes a mode switch and an output, the feed network being configured to, in a monopulse mode of operation, combine the received signals from the plurality of antenna elements in each quadrant to provide at the output a monopulse quadrant output signal from each quadrant, and in an interferometer mode of operation, to combine the received signals from a subset of the plurality of antenna elements in each quadrant to provide at the output an interferometer quadrant output signal from each quadrant. Actuation of the mode switch configures the feed network between the monopulse mode of operation and the interferometer mode of operation.

In one example of the dual monopulse/interferometer antenna system the subset of the plurality of antenna elements in each quadrant consists of one quarter of the plurality of antenna elements in each quadrant. In one example, the feed network includes for each quadrant of the array: a plurality of combining modules configured to combine the received signals to provide combined signals, a first RF collector configured to receive and combine a first set of the combined signals to provide a first collector output signal and a second collector output signal, and a second RF collector configured to receive and combine a remainder of the combined signals to provide a third collector output signal and a fourth collector output signal, the fourth collector output signal being a combination of the received signals from the subset of the plurality of antenna elements and corresponding to the interferometer output signal. In another example, the feed network further includes for each quadrant of the array: a quadrant RF collector configured to receive the first, second third and fourth collector signals, the quadrant RF collector including the mode switch and the output, and wherein the monopulse quadrant output signal corresponds to a combination of the first, second, third and fourth collector signals. In another example, the dual monopulse/interferometer antenna system further comprises a receiver coupled to the feed network and configured to receive and process the monopulse quadrant output signal from each quadrant, and to receive and process the interferometer quadrant output signal from each quadrant.

The quadrant RF collector may include, for example, a first two-to-one combiner configured to receive and combine the first and second collector signals to provide a first signal, a second two-to-one combiner configured to receive and combine the third and fourth collector signals to provide a second signal, and a third two-to-one combiner configured to receive and combine the first and second signals to provide the monopulse quadrant output signal. In one example, the quadrant RF collector further includes a first transmit amplifier/receive bypass device coupled between the first two-to-one combiner and the third two-to-one combiner and including a first amplifier, the first transmit amplifier/receive bypass device configured to amplify a transmit signal prior to distribution of the transmit signal to the plurality of antenna elements and to allow bypass of the first amplifier for receive of the first signal, and a second transmit amplifier/receive bypass device coupled between the second two-to-one combiner and the third two-to-one combiner and including a second amplifier, the second transmit amplifier/receive bypass device configured to amplify the transmit signal prior to distribution of the transmit signal to the plurality of antenna elements and to allow bypass of the second amplifier for receive of the second signal. In another example, the RF quadrant collector further includes a first input switch configured to selectively couple the first collector signal to one of a first termination load and the first two-to-one combiner, a second input switch configured to selectively couple the second collector signal to one of a second termination load and the first two-to-one combiner, a third input switch configured to selectively couple the third collector signal to one of a third termination load and the second two-to-one combiner, and a fourth input switch configured to selectively couple the fourth collector signal to one of the second two-to-one combiner and the mode switch. The RF quadrant collector may further include an output switch having a first terminal coupled to the third two-to-one combiner, a second terminal coupled to the mode switch and a third terminal coupled to the output, wherein the output switch is configured to selectively couple the third two-to-one combiner to the output to provide the monopulse quadrant output signal at the output, and the mode switch to the output to provide the interferometer quadrant output signal at the output.

According to another embodiment, a dual monopulse/interferometer radar system comprises an active electronically steered array including a monopulse array comprising four quadrants, each quadrant including a plurality of antenna elements, and an interferometer array comprising four patches, each patch including a subset of the plurality of antenna elements of a corresponding quadrant. The dual monopulse/interferometer radar system further comprises a feed network coupled to the array and configurable between a monopulse mode in which the feed network is configured to combine received signals from each of the plurality of antenna elements in each quadrant to provide four quadrant signals, and an interferometer mode in which the receiver is configured to receive and combine the received signals from the subset of the plurality of antenna elements in each patch to provide four patch signals, and a receiver coupled to the feed network and configured to receive the four quadrant signals and the four patch signals.

In one example, the feed network includes, for each quadrant, a combining network, a switch network and an output coupled to the receiver, the switch network being configured to couple the combining network to the output in the monopulse mode to provide one of the four quadrant signals at the output, and to couple a selected portion of the combining network to the output in the interferometer mode to provide one of the four patch signals at the output. The receiver may be configured to process the four quadrant signal to estimate a range to a target. The receiver may be further configured to process at least some of the four patch signals to estimate an angle of approach of the target.

Another embodiment is directed to a method of tracking a target using a radar system configurable between a monopulse mode of operation and an interferometer mode of operation. In one embodiment, the method comprises acquiring and tracking the target using the monopulse mode, estimating a range to the target, configuring the radar system from the monopulse mode into the interferometer mode responsive to the range to the target being below a threshold value, and acquiring angular information for the target using the interferometer mode. In one example, the method further comprises dynamically reconfiguring the radar system between the monopulse mode and the interferometer mode to update the range and the angular information.

Still other aspects, embodiments, and advantages of these exemplary aspects and embodiments, are discussed in detail below. Embodiments disclosed herein may be combined with other embodiments in any manner consistent with at least one of the principles disclosed herein, and references to "an embodiment," "some embodiments," "an alternate embodiment," "various embodiments," "one embodiment" or the like are not necessarily mutually exclusive and are intended to indicate that a particular feature, structure, or characteristic described may be included in at least one embodiment. The appearances of such terms herein are not necessarily all referring to the same embodiment.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. Where technical features in the figures, detailed description or any claim are followed by references signs, the reference signs have been included for the sole purpose of increasing the intelligibility of the figures and description. In the figures, each identical or nearly identical component that is illustrated in various figures is represented by a like numeral. For purposes of clarity, not every component may be labeled in every figure. In the figures:

DETAILED DESCRIPTION

Aspects and embodiments are directed methods and apparatus for improving the angular error of a monopulse radar system. According to one embodiment, a dual monopulse/interferometer radar is implemented using an active electronically steered array (AESA) antenna. As discussed in more detail below, interferometer operation is achieved using a subset of the elements of the monopulse array. As this subset may include relatively few array elements, individual calibration of the array elements may be performed, which allows for improved angular resolution relative to that achieved with the entire monopulse array.

It is to be appreciated that embodiments of the methods and apparatuses discussed herein are not limited in application to the details of construction and the arrangement of components set forth in the following description or illustrated in the accompanying drawings. The methods and apparatuses are capable of implementation in other embodiments and of being practiced or of being carried out in various ways. Examples of specific implementations are provided herein for illustrative purposes only and are not intended to be limiting. In particular, acts, elements and features discussed in connection with any one or more embodiments are not intended to be excluded from a similar role in any other embodiment.

Also, the phraseology and terminology used herein is for the purpose of description and should not be regarded as limiting. Any references to embodiments or elements or acts of the systems and methods herein referred to in the singular may also embrace embodiments including a plurality of these elements, and any references in plural to any embodiment or element or act herein may also embrace embodiments including only a single element. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. Any references to front and back, left and right, top and bottom, upper and lower, and vertical and horizontal are intended for convenience of description, not to limit the present systems and methods or their components to any one positional or spatial orientation.

Figure 1:
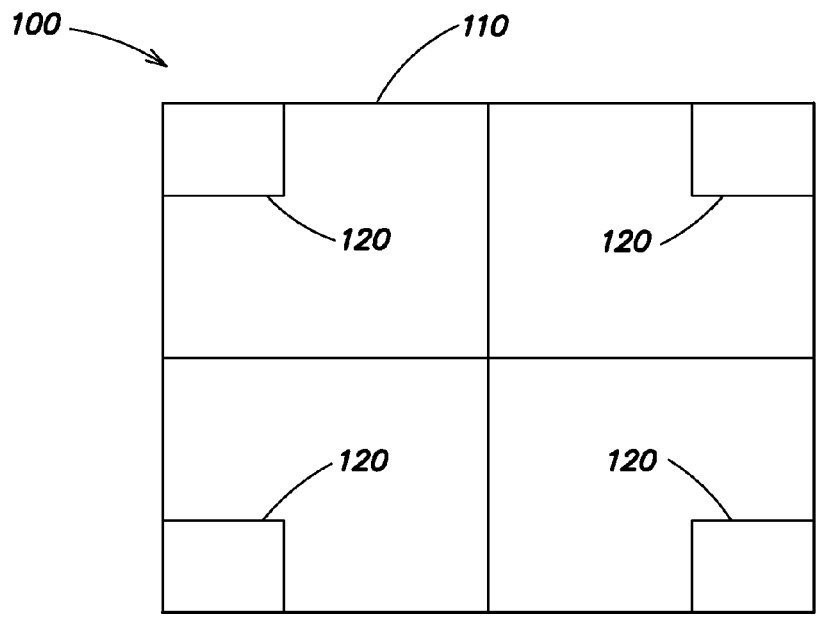
FIG. 1 is a block diagram of one example of a dual monopulse/interferometer antenna according to aspects of the invention.

Referring to FIG. 1, there is illustrated a block diagram of one example of a dual monopulse/interferometer antenna according to one embodiment. The antenna 100 may be implemented as an AESA; however other implementations (e.g., a planar antenna array or horn array) may be used. The antenna 100 is divided into four quadrants 110 to provide the monopulse operation, as discussed above. In the example of an AESA, the elements of the array 100 are all steered together electrically using phase shifters, and the target is illuminated equally by all four quadrants 110. A subset of the elements (referred to herein as a "patch" 120) of each quadrant 110 is configured to implement an interferometer radar, as discussed further below. In the example illustrated in FIG. 1, the patch 120 includes the outer corner of each quadrant 110. This configuration may have an advantage of providing the largest interferometric base for the radar; however, the patch 120 may include any portion of the quadrant 110.

Figure 2:
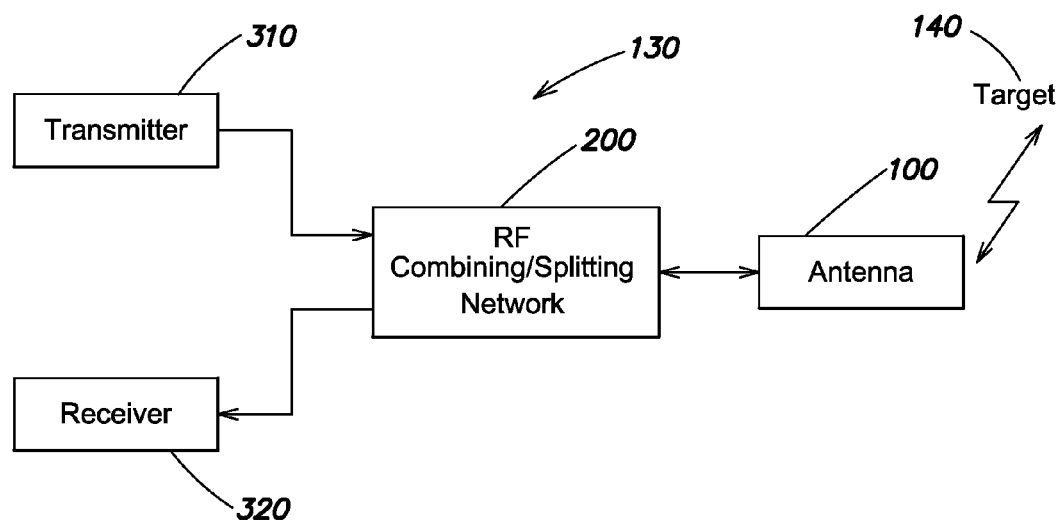
FIG. 2 is a functional block diagram of one example of a radar system using the antenna of FIG. 1 according to aspects of the invention.

FIG. 2 illustrates a functional block diagram of one example of a radar system 130 incorporating the antenna 100 according to one embodiment. A transmitter 310 generates an interrogation signal which is coupled to the elements of the antenna array via an RF combining/splitting network 200 (also referred to an RF feed network), and transmitted by the antenna 100 to illuminate a target 140. The signal is reflected by the target 140 and received by the antenna 100. The received signal is coupled from the antenna 100 via the RF feed network 200 to a receiver 320. In one example, during a monopulse mode of operation, the RF feed network 200 is configured to provide four quadrant signals to the receiver 320, one from each quadrant 110. The receiver 320 may process the quadrant signals to produce the sum, azimuth and elevation signals as discussed above. According to one embodiment, the RF feed network 200 that combines the signals received from each element in the antenna array 100 to produce the monopulse return signals is modified to couple out the four patches 120. The signals from the array elements in the four patches 120 may be combined in the receiver 320 to produce return signals that are analyzed according to interferometer radar principles, as discussed further below.

Figure 3:
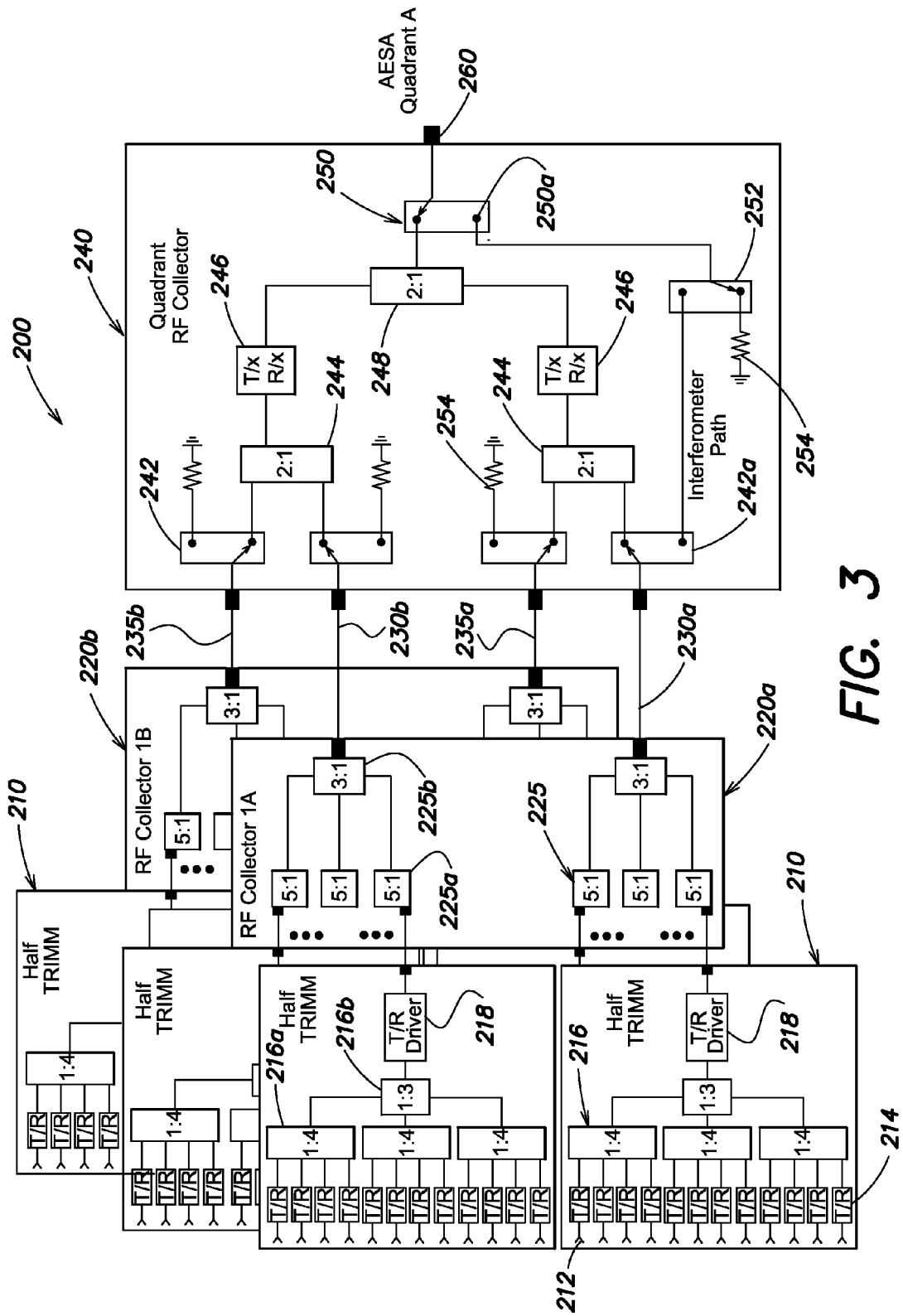
FIG. 3 is a schematic block diagram of a portion of an RF feed network according to aspects of the invention.

Referring to FIG. 3 there is illustrated a schematic block diagram of a portion of one example of an RF feed network 200 according to one embodiment. FIG. 3 illustrates a portion of the RF feed network 200 for one quadrant 110 and one patch 120 of the antenna 100. As discussed above, the RF feed network 200 also acts a splitting network for transmitting signals using the antenna 100. The RF feed network 200 includes a plurality of modules 210 referred to as "half TRIMMs" (transmit/receive integrated microwave module). In each module 210, the signals from the elements 212 of a segment of the quadrant 110 (including the patch 120) are passed through a transmit/receive block 214 (which may include an amplifier for example) and an array of combiners 216 to provide a first combined signal to a transmit/receive driver 218. The transmit/receive driver 218 is a gain stage, and includes an amplifier to amplify the first combined signal. The output from each transmit/receive driver 218 is provided to an RF collector 220.

In the illustrated example, the quadrant 110 (including the patch 120) is 24 elements by 30 elements in size, and the patch 120 includes one quarter of those elements. Thus, the patch 120 is made up of 12 elements by 15 elements (180 elements total). Accordingly, each module 210 combines the signals from 12 elements 212, and there are 60 modules 210 per quadrant in the network 200. Thus, the combiners 216 may include three 1:4 combiners 216a, followed by a 1:3 combiner 216b, as illustrated, to combine the signals from the 12 elements 212 into one combined signal provided to the transmit/receive driver 218. However, it is to be appreciated that other combining ratios and configurations of the combiners 216 may be used. For example, the combiners 216 may include two 6:1 combiners followed by a 2:1 combiner, or six 2:1 combiners, followed by two 3:1 combiners and then another 2:1 combiner. Furthermore, each module 210 may be configured to combine the signals from a number of array elements other than twelve, or the quadrant 110 may include a different number or arrangement of array elements.

In the example illustrated in FIG. 3, the RF feed network 200 includes two RF collectors 220a, 220b, each receiving and combining the signals from thirty modules 210. Thus, each RF collector 220 may include a number of combiners 225 to combine the signals received from each module 210 to produce a combined collector signals 230, 235. In the illustrated example, each RF collector 220 includes six 5:1 combiners 225a followed by two 3:1 combiners 225. Thus, the first RF collector 220a produces two combined collector signals 230a, 230b, and the second RF collector 220b produces two combined collector signals 235a, 235b. The combined collector signals 230a, 230b, 235a and 235b from the RF collectors 220a, 220b are provided to a quadrant RF collector 240. The quadrant RF collector 240 produces a quadrant output signal 260 which varies depending on whether the antenna 100 is operating in the monopulse mode or interferometer mode.

Still referring to FIG. 3, in one embodiment, the quadrant RF collector 240 includes a plurality of input switches 242 that configure the signal path through the quadrant RF collector 240 to provide the quadrant output signal 260. When the antenna 100 is operating in the monopulse mode, the switches 242 direct the combined collector signals 230a, 230b, 235a and 235b from the RF collectors 220a, 220b to 2:1 combiners 244. The signal from each 2:1 combiner 244 is internally switched to receive bypass in a transmit driver/receive bypass (Tx Driver/Rx Bypass) module 246 and then fed to a final 2:1 combiner 248 which provides a monopulse quadrant output signal, formed from the combination of the signals from each array element 212 in the quadrant, to an output switch 250. The output switch 250 directs the monopulse quadrant output signal to the output of the RF feed network 200 for the quadrant as the quadrant output signal 260. The output switch 250 is coupled to another switch 252 which couples the terminal 250a of the output switch to a termination load 254. Thus, each quadrant 110 provides the quadrant output signal 260, and the four signals (one from each quadrant) are processed by the receiver 320 to provide at least the sum, azimuth and elevation monopulse return signals, as discussed above.

When the antenna is operating in the interferometer mode, one input switch 242a directs the combined collector signal 230a to a mode switch 252. This signal 230a corresponds to the combination of the signals from the array elements 212 in the patch 120. In the example illustrated in FIG. 3, the elements 212 of the patch 120 correspond to the bottom 12 by 15 elements; however, as discussed above, the patch 120 may include any elements of the quadrant 110. The mode switch 252 is actuated to direct the combined collector signal 230a to the output switch 250 which is also actuated, for example, substantially simultaneously with the mode switch 252, to provide the combined collector signal 230a (received at terminal 250a) as the quadrant output signal 260. The remaining input switches 242 are actuated to couple the remaining combined collector signals 230b, 235a and 235b to termination loads 254. In one example, the termination loads 254 are 50 Ohm loads. Thus, the quadrant output signal 260 may be time-multiplexed to correspond to either the monopulse quadrant output signal, from the elements 212 of the quadrant 110, or an interferometer quadrant output signal from the subset of elements making up the patch 120.

Conventionally, an interferometer comprising a subset of elements from a monopulse array would have higher residual angular error due to reduced signal-to-noise ratio (SNR) from a reduced aperture gain (also referred to as array gain). However, according to one embodiment, differences in the SNR may be alleviated by using higher gain and lower noise figure settings on the receiver 320 and in the RF feed network 200. The noise figure is a measure of degradation of the SNR caused by the components in the RF signal path. According to one embodiment, the RF feed network 200 is configured to preserve the noise figure for the interferometer signal path thereby offsetting, at least in part, the reduced SNR due to reduced aperture gain. For example, referring again to FIG. 3, the switches 242a and 252 eliminate the final two stages of signal combining (combiners 244 and 248) from the interferometer signal path as well as the Tx Driver/Rx Bypass 246, thereby removing the contribution of these components to the noise figure of the interferometer signal path. The switches 242a, 252 may be low-low components and therefore may contribute only nominally to the noise figure of the interferometer signal path. In addition, when the system is operating in the interferometer mode, the receiver 320 may be configured to apply higher gain to the signal it receives from the RF feed network 200. These higher gain settings may not be usable when the system is operating in the monopulse mode due to the higher array gain in that mode.

In situations of high SNR, for example, those greater than 30 dB, the angular error approaches that of the pointing calibration error of the antenna 100. For example, for a tracking radar such as a fire control radar, tracking both an outgoing interceptor and an incoming threat, the SNR is high at engagement ranges, and the angular error becomes the relative error between the two targets. For the monopulse AESA, for high SNR, the angular error is dominated by the quantization error of the beam steering function. This is because for a high-gain antenna, and therefore long-range radar, the AESA includes a large number of array elements to provide high array gain and small beam width, and therefore individual calibration of all the possible beam positions of the array elements is impractical. In contrast, because in the interferometer mode, the radar uses only a small subset of the array elements (those in the patches 120 as discussed above) with a wide beam width, the relative beam position error may be calibrated individually potential beam position, thereby reducing the residual angular error. In one example, the relative beam position error for the interferometer mode is that of the probe used to perform the calibration.

According to one embodiment, the antenna 100 is implemented as an AESA with a fixed, constant spacing between each element in the array. Therefore, because the patch 120 has fewer elements than the quadrant 110, the patch 120 produces a wider beam than the quadrant 110. Accordingly, the patch 120 may illuminate a larger far-field angle space as the quadrant 110. This property allows the radar system 130 operating in the interferometer mode using the four patches 120 of the antenna 100 to achieve the same, or similar, angular coverage as when operating in the monopulse mode using the four quadrants 110 of the antenna 100 with much fewer beam positions but at a lower gain. Thus, the same target 140 may be tracked by the radar 130 in either the monopulse mode or the interferometer mode, at least within a certain range. As discussed above, in the monopulse mode, the antenna 100 has higher array gain (since it uses more elements) and the radar 130 may therefore be able to acquire and track a target at greater distance/range than when operating in the interferometer mode. However, at closer ranges, using the interferometer mode allows the radar to track the target with greater angular accuracy.

The improvement in residual angular error may be demonstrated by considering the following example of a dual monopulse/interferometer antenna. In this example, a Ku-band tracking AESA included a rectangular array of 48 (azimuth)×60 (elevation) elements on a grid spacing of 0.345 inches. Each quadrant includes 24×30 elements; however, for the monopulse array the beam width is given for the complete array because of the summing of the signals from each of the four quadrants. With this array configuration, the number of beams to cover −45° to +45° in azimuth and 5° to 80° in elevation is 1,228. The residual angular error, $A_{err}$, is given by:

$$A_{err} = \frac{\pi}{4} \times \frac{1}{2^B} \times BW \qquad (1)$$

In Equation (1), B is the number of bits in the phase shifters used to steer the array, and BW is the beam width. Using 5-bit phase shifters for beam-steering (i.e., B=5), the angular error is given by 0.0245×beam width in each dimension. For the simulated example array in the monopulse mode of operation, with a beam width in azimuth of 2.3° and a beamwidth in elevation of 1.8°, the residual angular error is 0.0440° or 0.77 milliradians (mRAD) in elevation, and 0.98 mRAD in azimuth.

For the same example AESA, a 12×15 element corner patch is used for the interferometer mode of operation. In the interferometer mode, since phase is compared for each receive antenna patch 120, one quadrant determines the beam width. As discussed above, the patch 120 produces a wider beam than the full quadrant 110. Accordingly, in this example, the number of beams to cover the same angular space (−45° to +45° in azimuth and 5° to 80° in elevation) is 77. Thus, since the number of beams is far fewer than that for the full array, each beam position may be calibrated for residual error to the relative accuracy of the calibration probe. In one example, this relative accuracy is 0.01° or 0.175 mRAD.

Figure 4:
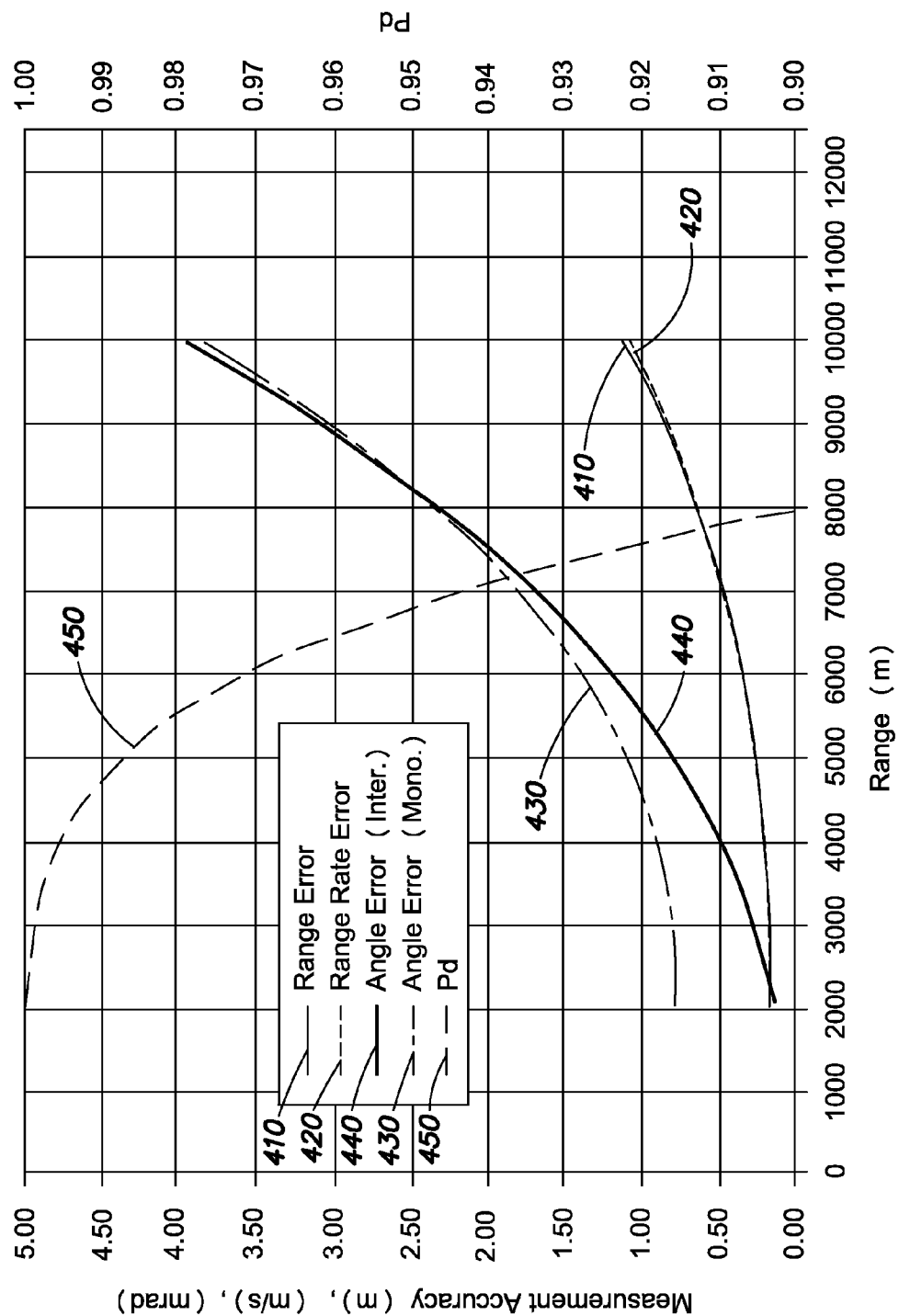
FIG. 4 is a graph illustrating simulated performance results for a example dual monopulse/interferometer antenna according to aspects of the invention.

To further demonstrate the improvement in residual angular error, a computer-based spreadsheet was used to calculate relative accuracy for the monopulse and interferometer modes of operation as a function of range from a notional −20 dBsm target. FIG. 4 is a graph of these results for the above example dual monopulse/interferometer AESA antenna. For the simulations, the results of which are illustrated in FIG. 4, the following parameters were used. The center frequency of the array was 15.7 GHz, the quadrant noise figure was 6.3 dB and the array gain was approximately 38 dB (for monopulse operation). In FIG. 4, trace 410 represents the range error (i.e., error in estimated range to the target) and trace 420 represents the range rate error (i.e., rate at which the range error changes) for the monopulse mode. In the interferometer mode, the range and range rate errors approach that of the monopulse mode for SNR>30 dB. Trace 430 represents the angular error for the monopulse mode of operation, and trace 440 represents the angular error for the interferometer mode of operation. As can be seen with reference to FIG. 4, at smaller ranges, the interferometer mode demonstrates a significant improvement in angular error. Trace 450 represents the probability of detecting the target, which decreases as the range to the target increases, but which is still approximately 90% when the range to the target is about 8 kilometers.

The resultant residual errors illustrated in FIG. 4 demonstrate that for an AESA, such as the example AESA discussed above, the interferometer mode of operation has superior angular accuracy at relatively close range. For the example AESA and target used in the simulation, the interferometer mode has superior angular accuracy for target ranges below approximately 7.5 kilometers.

According to one embodiment, since the antenna 100 may have higher gain in the monopulse mode and improved angular accuracy in the interferometer mode, a combination of the two modes may be used in a complimentary manner. For example, in a tracking radar, the monopulse mode may be used to acquire the target at long range, and as the target approaches, the interferometer mode may be used to obtain better angular accuracy. The radar system may be dynamically configured between the two modes, for example, under the control of a user, to utilize information obtained from both modes.

Figure 5:
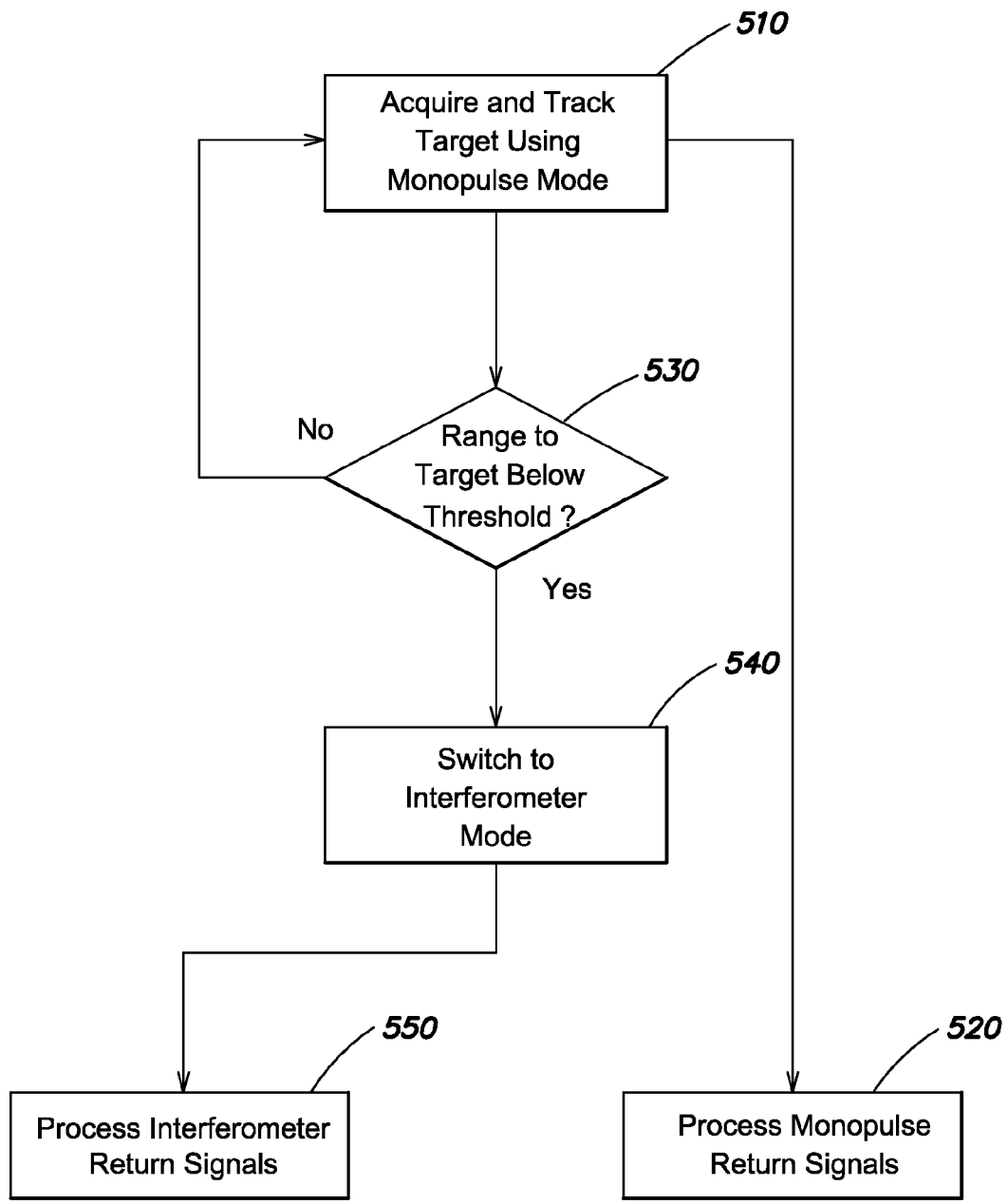
FIG. 5 is a flow diagram for one example of a method of operating a dual monopulse/interferometer antenna according to aspects of the invention.

Referring to FIG. 5 there is illustrated a flow diagram of one example of a method of operating a dual monopulse/interferometer antenna 100 according to one embodiment. In a first step 510, a radar system incorporating the antenna 100 is operated in the monopulse mode to acquire and optionally track a target at long range. While the antenna is operated as a monopulse array, the receiver 320 may process the signals from each quadrant 110 of the array to produce the monopulse return signals discussed above (step 520). As discussed above, one of the monopulse return signals that may be used by the receiver 320 is a sum signal that can be used to estimate the range to the target. Accordingly, in one embodiment, a system controller may monitor the range to the target and when the range falls below a certain threshold (step 530) switch the antenna operation from the monopulse mode to the interferometer mode (step 540). Thus, the radar system may use the higher gain of the monopulse mode to acquire and track a target a long range, and use the improved angular accuracy of the interferometer mode when the target is closer. While the antenna is operated as an interferometer array, the receiver 320 may process the signals from each patch 120 of the array to produce interferometer return signals (step 550).

In one example, the interferometer return signals may include a sum signal, an azimuth signal (used to determine range to the target) and an elevation signal (used to determine the target's position relative to the horizon), similar to the monopulse return signals discussed above. As discussed above, the monopulse return signals may be obtained using a comparator network to calculate difference signals between the different quadrants 110 of the antenna 100. In one example, the interferometer return signals are obtained by calculating phase differences between the signals from the different patches 120 of the antenna 100. For example, the difference in the phase ($\Delta\phi$) of a signal received by one patch 120 (e.g., the top left patch) and another patch 120 (e.g., the top right patch) in the array is given by:

$$\Delta\phi = \frac{2\pi d \sin\theta}{\lambda} \quad (2)$$

In Equation (2) d is the distance between the two patches 120, $\lambda$ is the operating wavelength of the antenna 100, and $\theta$ is the angle of incidence of the received signal at the antenna 100. In the interferometer mode, there can be an ambiguity in the estimated angle to the target arising from "rollovers" of 360° in the phase difference (the actual angle may be any one of a fixed set of angles corresponding to increments of 360° phase). However, this ambiguity may be resolved because an initial angle estimate may be obtained using the monopulse mode. Accordingly, the interferometer mode may be used in some examples for only an angle of arrival measurement of the target, with target range being obtained using the monopulse mode. Accordingly, the radar system may be switched continuously or periodically between the monopulse mode and the interferometer mode to track a target using the monopulse mode to track range and the interferometer mode to track angular information.

Having described above several aspects of at least one embodiment, it is to be appreciated various alterations, modifications, and improvements will readily occur to those skilled in the art. Such alterations, modifications, and improvements are intended to be part of this disclosure and are intended to be within the scope of the invention. Accordingly, the foregoing description and drawings are by way of example only, and the scope of the invention should be determined from proper construction of the appended claims, and their equivalents.

What is claimed is:

1. A dual monopulse/interferometer antenna system comprising:
    an active electronically steered array including four quadrants, each quadrant including a plurality of antenna elements configured to receive radio frequency (RF) signals and to provide received signals; and
    a feed network coupled to the array and including a mode switch and an output, the feed network being configured to, in a monopulse mode of operation, combine the received signals from the plurality of antenna elements in each quadrant to provide at the output a monopulse quadrant output signal from each quadrant, and in an interferometer mode of operation, to combine the received signals from a subset of the plurality of antenna elements in each quadrant to provide at the output an interferometer quadrant output signal from each quadrant, the subset of the plurality of antenna elements in each quadrant including those antenna elements positioned at an outer corner of each quadrant;
    wherein actuation of the mode switch configures the feed network between the monopulse mode of operation and the interferometer mode of operation.

2. The dual monopulse/interferometer antenna system of claim 1, wherein the subset of the plurality of antenna elements in each quadrant consists of one quarter of the plurality of antenna elements in each quadrant.

3. The dual monopulse/interferometer antenna system of claim 1, wherein the feed network includes for each quadrant of the array:
    a plurality of combining modules configured to combine the received signals to provide combined signals;
    a first RF collector configured to receive and combine a first set of the combined signals to provide a first collector output signal and a second collector output signal; and
    a second RF collector configured to receive and combine a remainder of the combined signals to provide a third collector output signal and a fourth collector output signal, the fourth collector output signal being a combination of the received signals from the subset of the plurality of antenna elements and corresponding to the interferometer output signal.

4. The dual monopulse/interferometer antenna system of claim 3, wherein the feed network further includes for each quadrant of the array:
    a quadrant RF collector configured to receive the first, second third and fourth collector signals, the quadrant RF collector including the mode switch and the output; and
    wherein the monopulse quadrant output signal corresponds to a combination of the first, second, third and fourth collector signals.

5. The dual monopulse/interferometer antenna system of claim 4, wherein the quadrant RF collector includes:
   a first two-to-one combiner configured to receive and combine the first and second collector signals to provide a first signal;
   a second two-to-one combiner configured to receive and combine the third and fourth collector signals to provide a second signal; and
   a third two-to-one combiner configured to receive and combine the first and second signals to provide the monopulse quadrant output signal.

6. The dual monopulse/interferometer antenna system of claim 5, wherein the quadrant RF collector further includes:
   a first transmit amplifier/receive bypass device coupled between the first two-to-one combiner and the third two-to-one combiner and including a first amplifier, the first transmit amplifier/receive bypass device configured to amplify a transmit signal prior to distribution of the transmit signal to the plurality of antenna elements and to allow bypass of the first amplifier for receive of the first signal; and
   a second transmit amplifier/receive bypass device coupled between the second two-to-one combiner and the third two-to-one combiner and including a second amplifier, the second transmit amplifier/receive bypass device configured to amplify the transmit signal prior to distribution of the transmit signal to the plurality of antenna elements and to allow bypass of the second amplifier for receive of the second signal.

7. The dual monopulse/interferometer antenna system of claim 5, wherein the RF quadrant collector further includes:
   a first input switch configured to selectively couple the first collector signal to one of a first termination load and the first two-to-one combiner;
   a second input switch configured to selectively couple the second collector signal to one of a second termination load and the first two-to-one combiner;
   a third input switch configured to selectively couple the third collector signal to one of a third termination load and the second two-to-one combiner; and
   a fourth input switch configured to selectively couple the fourth collector signal to one of the second two-to-one combiner and the mode switch.

8. The dual monopulse/interferometer antenna system of claim 7, wherein first, second and third termination loads are 50 Ohm loads.

9. The dual monopulse/interferometer antenna system of claim 7, wherein the RF quadrant collector further includes an output switch having a first terminal coupled to the third two-to-one combiner, a second terminal coupled to the mode switch and a third terminal coupled to the output; wherein the output switch is configured to selectively couple the third two-to-one combiner to the output to provide the monopulse quadrant output signal at the output, and the mode switch to the output to provide the interferometer quadrant output signal at the output.

10. The dual monopulse/interferometer antenna system of claim 1, further comprising a receiver coupled to the feed network and configured to receive and process the monopulse quadrant output signal from each quadrant, and to receive and process the interferometer quadrant output signal from each quadrant.

11. A dual monopulse/interferometer radar system comprising:
   an active electronically steered array including:
      a monopulse array comprising four quadrants, each quadrant including a plurality of antenna elements; and
      an interferometer array comprising four patches, each patch including a subset of the plurality of antenna elements positioned at an outer corner of a corresponding quadrant;
   a feed network coupled to the array and configurable between a monopulse mode in which the feed network is configured to combine received signals from each of the plurality of antenna elements in each quadrant to provide four quadrant signals, and an interferometer mode in which the receiver is configured to receive and combine the received signals from the subset of the plurality of antenna elements in each patch to provide four patch signals; and
   a receiver coupled to the feed network and configured, for the monopulse mode of the feed network, to receive and process the four quadrant signals, to combine the four quadrant signals to produce a sum signal, and to estimate a range to a target based on the sum signal, the receiver being further configured, for the interferometer mode of the feed network, to receive and process the four patch signals to provide interferometer return signals, and to estimate an angle of approach of the target based on the interferometer return signals.

12. The dual monopulse/interferometer radar system of claim 11, wherein the feed network includes, for each quadrant, a combining network, a switch network and an output coupled to the receiver, the switch network being configured to couple the combining network to the output in the monopulse mode to provide one of the four quadrant signals at the output, and to couple a selected portion of the combining network to the output in the interferometer mode to provide one of the four patch signals at the output.

13. A method of tracking a target using a radar system configurable between a monopulse mode of operation and an interferometer mode of operation, the method comprising:
   acquiring and tracking the target using the radar system in the monopulse mode;
   estimating a range to the target using a receiver of the radar system;
   configuring the radar system from the monopulse mode into the interferometer mode responsive to the range to the target being below a threshold value; and
   acquiring angular information for the target using the radar system in the interferometer mode.

14. The method of claim 13, further comprising dynamically reconfiguring the radar system, under control of a user, between the monopulse mode and the interferometer mode to update the range and the angular information.

15. The dual monopulse/interferometer radar system of claim 11, further comprising a system controller configured to monitor the range to the target and to configure the feed network into the interferometer mode responsive to the range to the target being below a threshold value.

16. The dual monopulse/interferometer antenna system of claim 10, wherein the receiver is configured combine the monopulse quadrant output signals from each quadrant to produce a sum signal, and to estimate a range to a target based on the sum signal; and
   wherein the receiver is further configured to process the interferometer quadrant output signals from each quadrant to provide interferometer return signals, and to estimate an angle of approach of the target based on the interferometer return signals.

* * * * *